(No Model.)
R. L. McLAREN.
CAR AXLE.
No. 483,470. Patented Sept. 27, 1892.
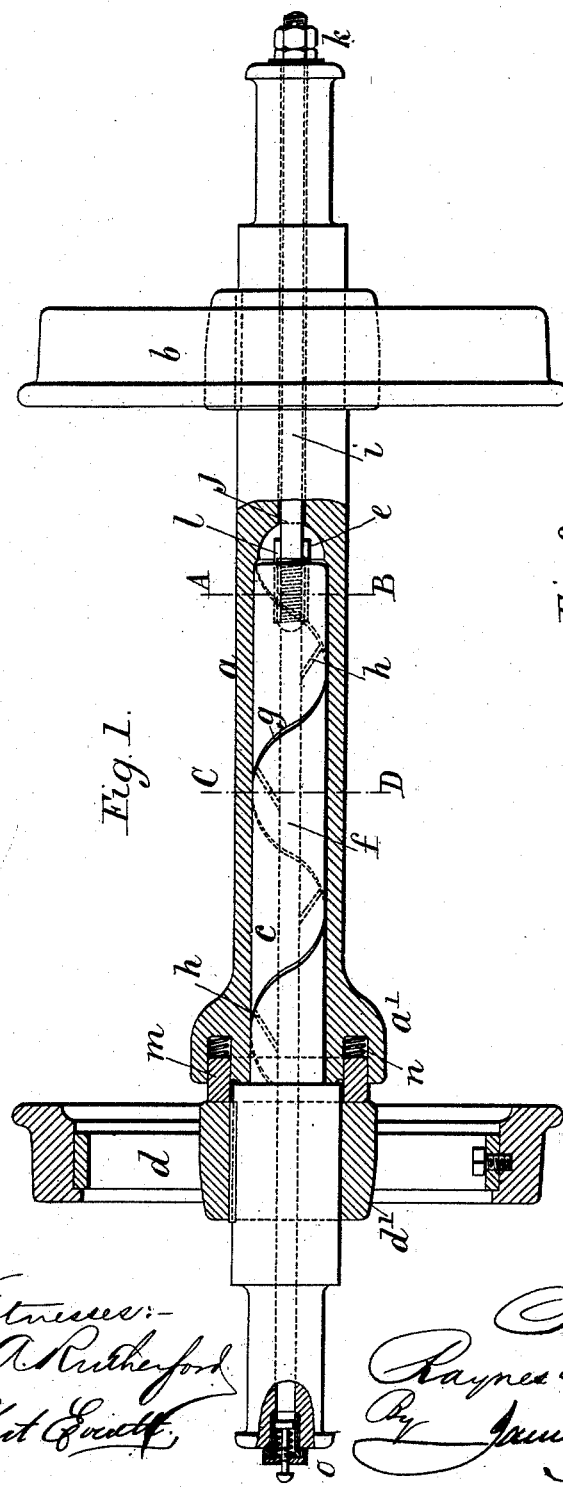
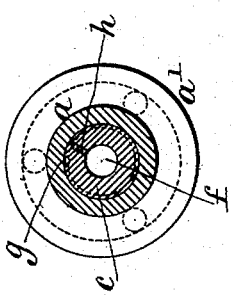
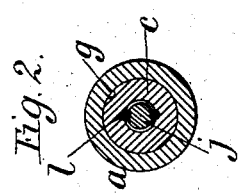

UNITED STATES PATENT OFFICE.

RAYNES L. McLAREN, OF BLACKHEATH, ENGLAND.

CAR-AXLE.

SPECIFICATION forming part of Letters Patent No. 483,470, dated September 27, 1892.

Application filed April 9, 1892. Serial No. 428,502. (No model.) Patented in England July 9, 1891, No. 11,696.

*To all whom it may concern:*

Be it known that I, RAYNES LAUDER MCLAREN, a citizen of England, residing at 32 Wemyss Road, Blackheath, in the county of Kent, England, have invented certain new and useful Improvements in Divided Axles for Railway and Tramway Wheels, (for which I have obtained Letters Patent in Great Britain, dated July 9, 1891, No. 11,696,) of which the following is a specification.

My invention relates to divided axles for railway or tramway wheels of the kind wherein the one part of the axle carrying the one wheel is made tubular and has the other part carrying the other wheel fitted into it in such manner that while the two parts are held together each part can revolve independently of the other. According to my invention I construct such axles as I will describe with reference to the accompanying drawings, in which—

Figure 1 shows a divided axle and pair of wheels, partly in elevation and partly in section; and Figs. 2 and 3 show, respectively, cross-sections on line A B and C D, Fig. 1.

The axle is composed of the tubular part $a$, having the wheel $b$ fixed thereon, and the part $c$, fitting into the part $a$ and having the wheel $d$ fixed thereon. The tubular part $a$ is accurately bored out to near the end of its larger bore, and the part $c$ is turned so as to fit accurately into such bored part, leaving a chamber $e$ at the end of the latter, which forms a reservoir for lubricant, it being made to communicate for this purpose with a central passage $f$ in the part $c$, as hereinafter described. This passage is closed at the outer end by any suitable known construction of lubricator for the supply of lubricant to the said passage. By the above-described construction it will be seen that any transverse strains to which the divided axle is subjected are distributed along the whole length of the bearing-surfaces of the two parts, thus greatly reducing any wear thereof. On the cylindrical surface of the inner part of $c$ is formed a helical channel $g$, and the central passage $f$ communicates at various points with such channel by means of radial channels $h$, so that the lubricant is by this means effectually supplied from passage $f$ to the entire bearing-surfaces of $a$ and $c$. The end of the channel $g$ communicates with the space $e$, so that the lubricant also finds its way into this space, and is supplied thence to a central boring $i$, formed through the outer part of $a$. Into the end of the part $c$ is secured a rod $j$, that passes through such boring, and has locked nuts $k$ screwed onto its projecting end, with a washer inside and with a split pin outside these nuts, if necessary, so that by this means the part $a$ and $c$ are held securely together, while they are free to rotate independently of each other. The rod is prevented from becoming unscrewed from the part $c$ by drilling longitudinal holes through the threads and driving in pins, as shown at $l$, Fig. 2. The rod $j$ might of course be formed in one with the part $c$; but it will be obvious that this would be a more expensive arrangement. The open end of the tubular part of $a$ is formed with an enlargement $a'$, against which fits the shoulder of the part $c$ and which has a circular groove, into which is fitted a metal packing-ring $m$. This is pressed outward by springs $n$, so as to bear with its outer face against the inner turned face of the boss $d'$ of the wheel $d$, fixed on $c$. By this means any access of grit to the joint between the part $a$ and $c$ is prevented. Should in course of time any slight looseness through wear occur between the shoulder of the part $c$ of the axle and the end face of the part $a$, the two parts can be tightened up by means of the screw-nuts $k$, there being sufficient room left for such adjustment at the inner end of the bore of $a$. After such tightening up the hole for the split pin can be enlarged and a larger split pin be inserted, and should the shoulder of the part $c$, against which the end of $a'$ bears, become worn considerably it can be turned down, a ring be shrunk on in front of it, and this be then turned up to the original dimensions.

Having thus described the nature of my invention and the best means I know for carrying the same into practical effect, I claim—

1. In a divided axle, the combination of a tubular part $a$, a part $c$, fitting into the part $a$ with turned cylindrical bearing-surfaces of the same diameter throughout and extending through the greater part of said part $a$, and a rod $j$, passing freely through a central boring of the outer end of part $a$, such rod being screwed into the part $c$ and secured at the outer end of part $a$ by a screw-nut $k$, so as to secure the parts $a$ and $c$ together, substantially as described.

2. In a divided axle, the combination of a tubular part $a$, a part $c$, fitting into $a$ with turned cylindrical surfaces, a rod $j$, fixed to part $c$ and passing through a central boring of $a$ and secured externally by a screw-nut $k$, and a packing-ring $m$, fitting a circular groove in the end face of the part $a$ and pressed by springs against the inner face of the wheel fixed on the part $c$, substantially as described.

3. In a divided axle, the combination of a tubular part $a$, a part $c$, fitting into $a$ with turned cylindrical surfaces, a central longitudinal passage $f$, formed in the part $c$ for the reception of lubricant and communicating at the inner end with a chamber $e$ in the part $a$, a helical channel $g$ on the part $c$, radial channels $h$, connecting the passage $f$ with the passage $g$ and with a chamber $e$, and a rod $j$, extending from the part $c$ and passing through a central bore in the part $a$ and secured beyond the same by a screw-nut, substantially as described.

4. In a divided axle, the combination of a tubular part $a$, a part $c$, fitting with a turned cylindrical surface the bored hollow of the part $a$, means for securing the parts $a$ and $c$ together so that they can revolve independently of each other, but cannot separate, and a packing-ring fitting a circular groove in the enlarged end of the tubular part $a$ and pressed by springs against the turned inner face of the boss of the wheel fixed on the part $c$, substantially as described.

In testimony whereof I have signed my name to this specification, in the presence of two subscribing witnesses, this 28th day of March, A. D. 1892.

RAYNES L. McLAREN.

Witnesses:
CHAS. D. ABEL,
28 Southampton Buildings, London, W. C.
JNO. P. M. MILLARD,
Clerk to Messrs. Abel & Imray, Consulting Engineers and Patent Agents, 28 Southampton Buildings, London, W. C.